United States Patent
Rabo

(10) Patent No.: US 6,460,284 B1
(45) Date of Patent: Oct. 8, 2002

(54) SIMULATED WING MOVEMENT ON A DECOY

(76) Inventor: Frederick N. Rabo, 2120 Oro-Chico Hwy., Durham, CA (US) 95938

( * ) Notice: Subject to any disclaimer, the term of this patent is extended or adjusted under 35 U.S.C. 154(b) by 0 days.

(21) Appl. No.: 09/576,835

(22) Filed: May 22, 2000

(51) Int. Cl.[7] .............................................. A01M 31/06
(52) U.S. Cl. .................................... 43/3; 43/2; 43/17.5
(58) Field of Search ................... 43/2, 3, 17.5; 40/902, 40/442, 540; 446/485, 244

(56) References Cited

U.S. PATENT DOCUMENTS

| | | | | |
|---|---|---|---|---|
| 1,698,223 A | * | 1/1929 | Craig | 40/902 |
| 1,828,177 A | * | 10/1931 | Curtiss | 40/442 |
| 2,631,040 A | * | 3/1953 | Constantine | 40/902 |
| 4,338,742 A | * | 7/1982 | Outtrim et al. | 446/485 |
| 4,565,022 A | * | 1/1986 | Chapin | 40/442 |
| 4,620,385 A | * | 11/1986 | Carranza et al. | 43/3 |
| 4,734,074 A | * | 3/1988 | Kinberg et al. | 446/485 |
| 4,757,631 A | * | 7/1988 | Anson-Smith | 43/17.5 |
| 4,889,514 A | * | 12/1989 | Auer et al. | 446/485 |
| 4,896,448 A | * | 1/1990 | Jackson | 43/3 |
| 5,003,719 A | * | 4/1991 | Whitlock et al. | 43/17.5 |
| 5,157,857 A | * | 10/1992 | Livingston | 43/17.5 |
| 5,191,730 A | * | 3/1993 | Balmer | 43/3 |
| 5,321,591 A | * | 6/1994 | Cimock et al. | 446/485 |
| 5,377,439 A | * | 1/1995 | Roos et al. | 43/3 |
| 5,809,683 A | * | 9/1998 | Solomon | 43/3 |
| 5,862,619 A | * | 1/1999 | Stancil | 43/3 |
| 5,956,880 A | * | 9/1999 | Sugimoto | 43/2 |
| 5,989,091 A | * | 11/1999 | Rodgers | 446/153 |
| 6,092,323 A | * | 7/2000 | McBride et al. | 43/3 |
| 6,170,188 B1 | * | 1/2001 | Mathews | 43/3 |

* cited by examiner

Primary Examiner—Darren W. Ark

(57) ABSTRACT

A bird decoy and method for providing simulated wing motion, or enhancing the appearance of motion of a simulated wing, and comprising a wing simulating structure for simulating wings of a flying bird, the wing simulating structure mounted to a support base for holding the wing simulating structure positioned with an upper surface thereof facing upward at least some of the time. Included is an electrical power source operatively connected for powering an electric illuminant, the illuminant preferably being multiple LEDs positioned to illuminate the upper surface of the wing simulating structure. The electric illuminant further operatively connected to automatic switching circuitry for switching the illuminant cyclically On and then Off in illumination upon the upper surface of the wing simulating structure, thereby providing a cyclical lighter then darker appearance, whereby the bird decoy visually simulates wing motion. The support base preferably includes a duck or goose shaped decoy. Various aspects to be remotely controlled are described.

8 Claims, 5 Drawing Sheets

SIMULATED WING MOVEMENT ON A DECOY

BACKGROUND OF THE INVENTION

1. Field of the Invention

The present invention relates to decoys useful for attracting animals such as flying birds.

2. Brief Description of the Related Prior Art

I am not aware of any prior art which is the same as my invention or which provides all of the benefits thereof, however, prior art related to the present invention can be found in U.S. classification 043, subclass 3.

A specific example of a related prior art device is disclosed in U.S. Pat. No. 4,896,448 issued to L. Jackson. The Jackson decoy includes wings (simulated wings) of a duck or goose which are pivotally linked to the decoy body and physically moved by a battery powered motor in order to provide the appearance of flapping wings to other birds such as ducks or geese flying overhead.

Another specific example of a related prior art device is disclosed in U.S. Pat. No. 5,862,619 issued to J. Stancil. The Stancil decoy includes panel or vane like wings (simulated wings) of a duck or goose which are pivotally mounted on support arms mountable to a decoy body and physically moved by either the wind or a battery powered motor in order to provide the appearance of flapping wings to viewing birds. The Stancil panel like structure used to simulate wings includes light and dark areas which when moved, in a rotating fashion by the wind or a motor, present the appearance of wing flapping.

While actual movement as in the Jackson and Stancil decoys is effective at attracting the attention of birds, the motor and linkage arrangements are relatively expensive to manufacture, subject to wear and jamming, and actual movement when motor driven requires significant electrical power consumption which limits the length of time the decoy can operate due to a fairly rapid battery drain.

SUMMARY OF THE INVENTION

The present invention can be viewed as a method, method and device or structural arrangement (device) to create the illusion of wing movement or to intensify the appearance of actual movement of a bird decoy by illuminating, with an electric illuminant(s), a surface in a strobing On/Off or light colored illumination followed by a darker colored illumination in a cyclical manner. My strobe light arrangement can be utilized on a decoy basically having no moving parts. Alternatively the strobe light arrangement can also be used to intensify the appearance of physical movement, such as the movement in prior art style simulated wings as in Stancil type decoys, by blinking on a moving surface thereof, the blinking preferably, but not required, being timed to the movement so the light is On when a lighter appearing side is facing up or the wing is raised. Strobe lighting of the surface causes a light then dark appearance, repeated cyclically, which apparently appears to ducks, geese (waterfowl) and other birds as wings flapping, thus further ensuring that the decoy is in fact a real bird, which hopefully results in the viewing bird or birds flying closer in and into camera or gun range. A method according to the invention of simulating flapping wing motion in a bird attracting decoy includes illuminating a wing simulating structure to a first level of brightness for simulating an appearance of raised wings or wings in a first position, and then reducing the level of brightness from the first level for simulating an appearance of lowered wings or wings in a second position, and repeating the illumination to the first level and followed by reducing the level of brightness; the levels of brightness preferably achieved by using electric powered light emitters, preferably LEDs, preferably super bright white LEDs, the LEDs switched between illuminated and nonilluminated states, "On and Off states", for the raising and lowering of the illumination brightness on the wing simulating structure. "LED" is short for light emitting diode, with "LEDs" meaning plural such diodes. The use of LEDs as the light emitters provides for very low electric power consumption and thus greatly extended battery life; high durability and long life due to the absence of a delicate wire filament; and LEDs come in a selection of various colors including white, red, amber and green which can be used with a wide variety of colors applied on the simulated wings with some colors being potentially more attractive to certain bird species.

The present invention is inexpensive to manufacture, consumes very little electrical power, is dependable in operation and versatile in use, i.e., used on either stationary simulated wings or moving simulated wings.

BEST MODES FOR CARRYING OUT THE INVENTION

The present invention is applied or used to create the illusion of wing movement or to intensify the appearance of actual movement of a bird decoy or part thereof by illuminating, with one or more electric illuminants, a surface of a simulated wing structure in a strobing On/Off or light (bright) color then darker color cyclical manner. Strobe lighting of the surface of the wing causes a lighter then dark appearance, repeated cyclically, which apparently appears to ducks, geese (waterfowl) and other birds as wings flapping up and down, thus further ensuring that the decoy is in fact a real bird, which hopefully results in the viewing bird or birds flying closer in. The strobe lighting is preferably controlled by automatic means such as circuitry structured to illuminate and de-illuminate the light element of the illuminant, i.e., turn the LEDs On and Off cyclically, or energize and de-energize an electrically powered light emitter. While I consider many structural arrangement other than that specifically shown in my drawings to be within the scope of my invention, my herewith included drawings are provided for example and are not intended to be limiting. Upon reading this disclosure, those skilled in the art will be readily able to build and use the present invention, and will know that many various changes can be made to that shown in my drawings and herein described without departing from the invention as claimed.

Figure 1:
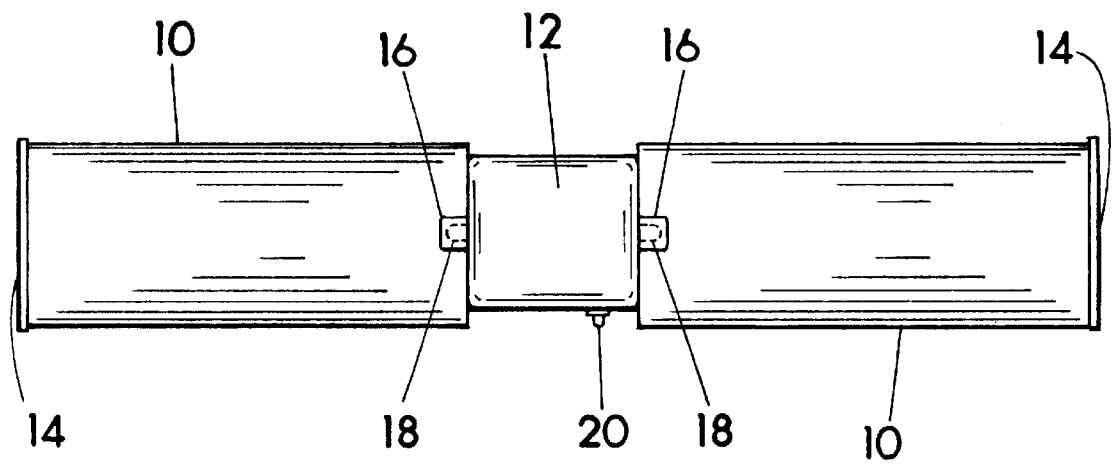
FIG. 1 shows a simulated wing embodiment and housing from a top view in accordance with the invention.
Figure 2:
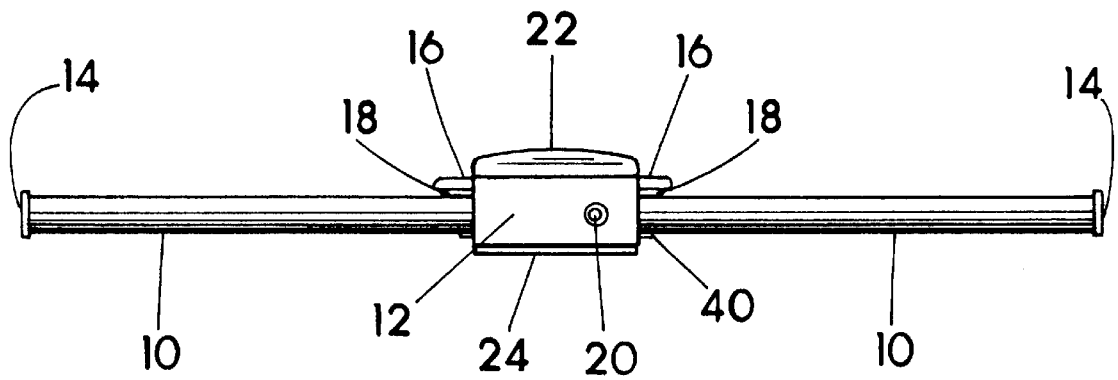
FIG. 2 shows the structure of FIG. 1 in a side view.
Figure 3:
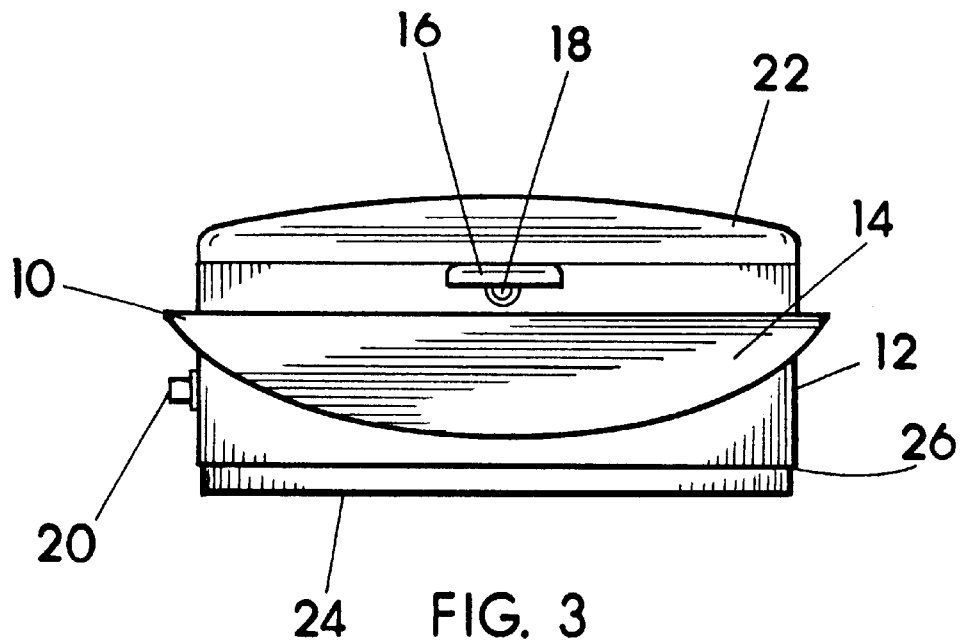
FIG. 3 shows the structure of FIG. 1 from one end, a view from the opposite end appears as a mirror image.
Figure 4:
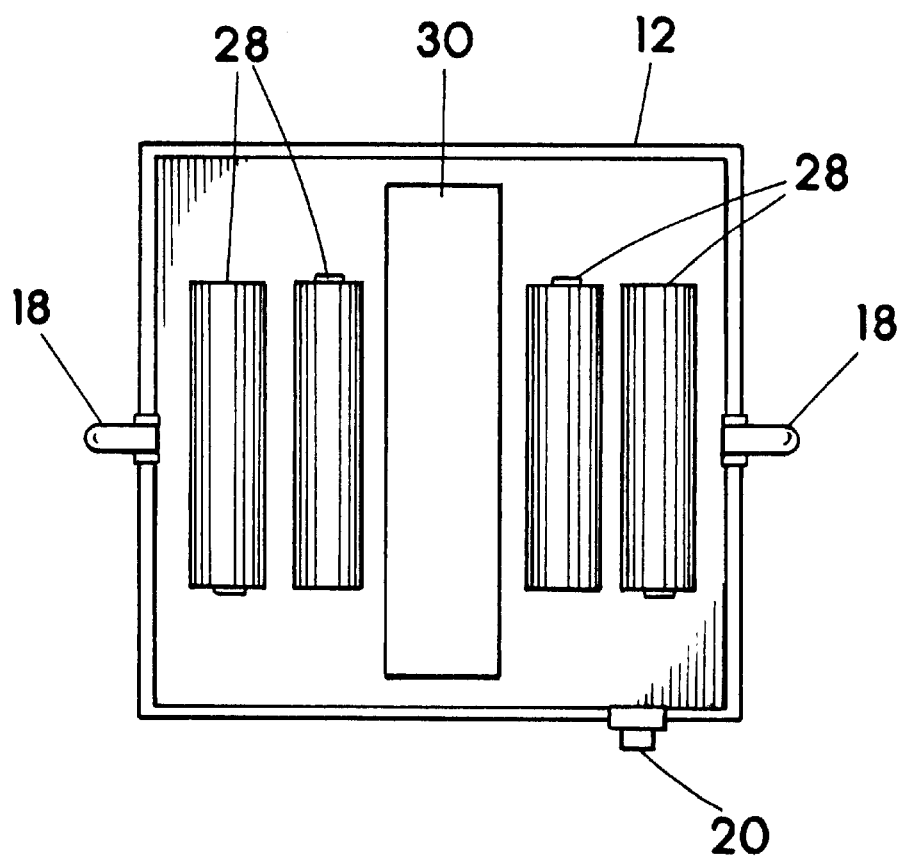
FIG. 4 illustrates the housing with top or lid removed.
Figure 7:
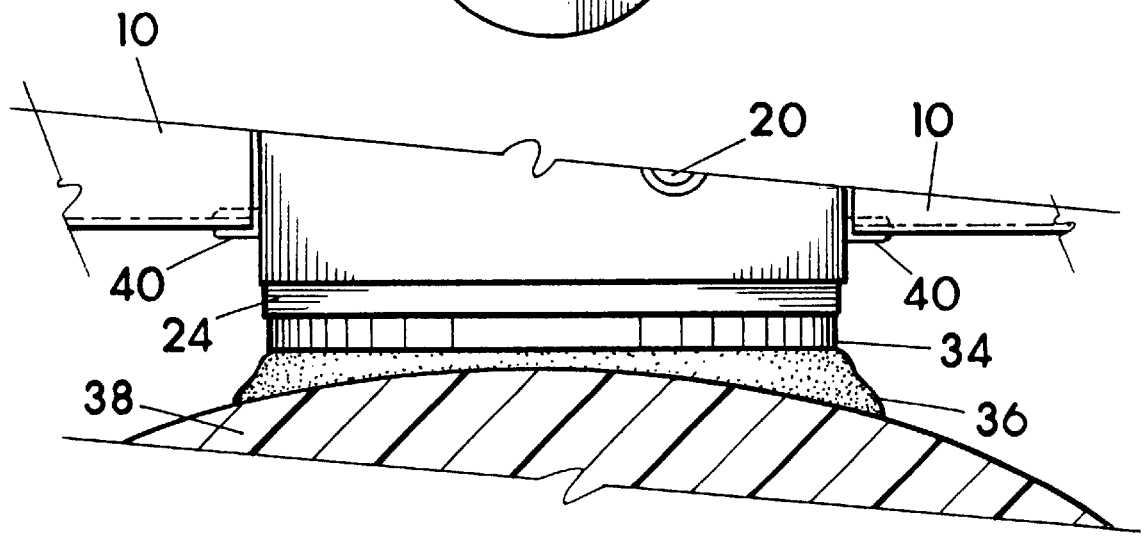
FIG. 7 shows a mounting arrangement for mounting the housing to a support base or decoy body.

FIGS. 1–3 show a simulated wing structure 10 and housing 12 from a top view in FIG. 1, a side view in FIG. 2, and end view in FIG. 3 in accordance with the invention. Specifically shown are two wing elements or member referred to as wings 10 or jointly as wing 10 with the housing 12 positioned between the wings 10. Wings 10 are each shown elongated having a lengthwise axis extending through housing 12. The wings 10 are attached to housing 12 with mounts 40 (FIGS. 7–8) which are connected to the housing and define a slot or receiving mouth which tightly receives the wing 10 end edge and tightly hold the edge and thus wing. In the herein example, wings 10 are each thin material, rigid or semi-rigid panels which are upwardly dished to form an elongated cup or dish shape, the distal ends away from housing 12 are closed with affixed end panels 14, thereby the upper dished surface of each wing member 10 is a shallow open-topped container shaped to be filled with light directed downward from LEDs 18 and to contain the light to a degree so that clear visual definition is provided, as opposed to the light be able to shine in an uncontrolled pattern, although the uncontrolled pattern would be acceptable in some applications. When dished wings are used, one or more openings should be applied to drain collected water such as rain.

Figure 8:
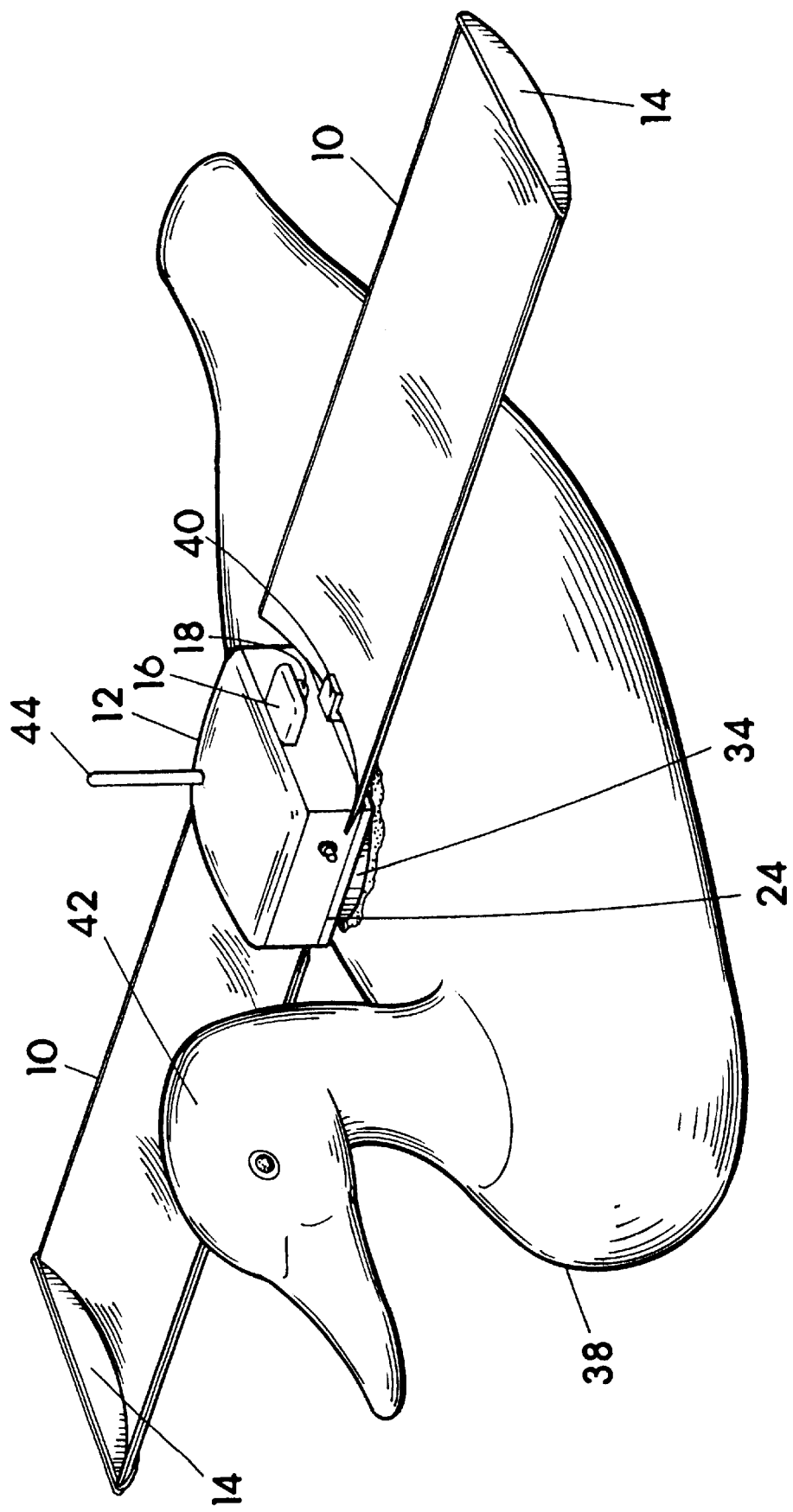
FIG. 8 shows a decoy body or support base with simulated wing embodiment and housing from a top front perspective view.

Wing 10 and housing 12 can be made of plastics to be low cost and corrosion resistant, although other materials can be used. Housing 12 serves several functions is this example, serving to hold the adjacent ends of the wing members 10 at friction or snap mounts 40; holding or serving as a mount for each of two shown LEDs 18, one LED 18 positioned over the adjacent end of wing member 10 so as to illuminate the wing when lit (illuminated). Housing 12 in this example can be viewed as a support base of the wing simulating structure, although the housing 12 is itself supported on a support base in a preferred arrangement, the support base being a bird or water fowl shaped decoy as shown in FIG. 8. Housing 12 also supports or holds opaque shields 16, one small shield 16 over each LED 18 in order to help prevent the light from shining straight upward and into the eyes of overhead flying birds. Housing 12 includes a top or lid 22 which is openable (movable or removable) to allow the changing of batteries 28 and the like. Light shields 16, LEDs 18, antenna 44 (FIG. 8), On/Off switch 20 and RF (radio frequency) or IR (Infrared) sensors and the like can of course be mounted to lid 22 as opposed to the sidewalls of housing 12, and the housing 12 and other components are water tight where appropriate.

Housing 12 includes a bottom exterior or bottom panel 26 to which is attached a first component of a ferric material and magnet mounting arrangement. In this example the magnet 24 of the mounting arrangement is attached with glue, screws or other suitable arrangements to the bottom 26 of housing 12 to be exposed for engagement and magnetic coupling to a ferris material member or steel disk 34 attached with glue (silicone rubber adhesive) 36 to the top back of a decoy body 38, the decoy body being a support base which is in FIG. 8 shown as a buoyant decoy with body and head 42 of the common prior art floating duck decoy type. Wing 10 and housing 12 is mounted in use so that the upper surface of the wing 10 or wing members faces upward toward the sky to be viewed by birds flying overhead, but the support base does not have to float in water as common with waterfowl decoys, and could be ground supported or secured or the like in the scope of the invention. The magnetic coupling arrangement of FIGS. 7 and 8 could have the magnet 24 attached to the decoy body and the ferris material disk 34 attached to the housing 12, and allows the ready removal of the housing 12 and wings 10 from the decoy such as for transport and or storage. Permanent attachment of housing 12 and related equipment to the support base or body can of course be applied within the scope of the invention, as can simply resting the wing 10 simulating structure with illuminant on the ground.

Figure 5:
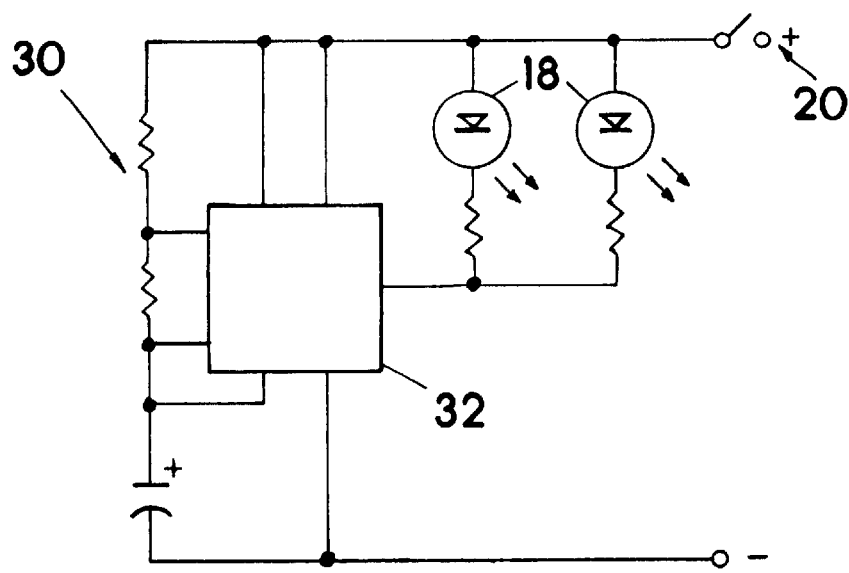
FIG. 5 shows circuitry related to powering and blinking lights or LEDs.
Figure 6:
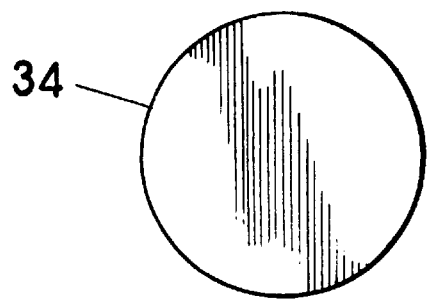
FIG. 6 shows a ferris material or steel disk.
Figure 9:
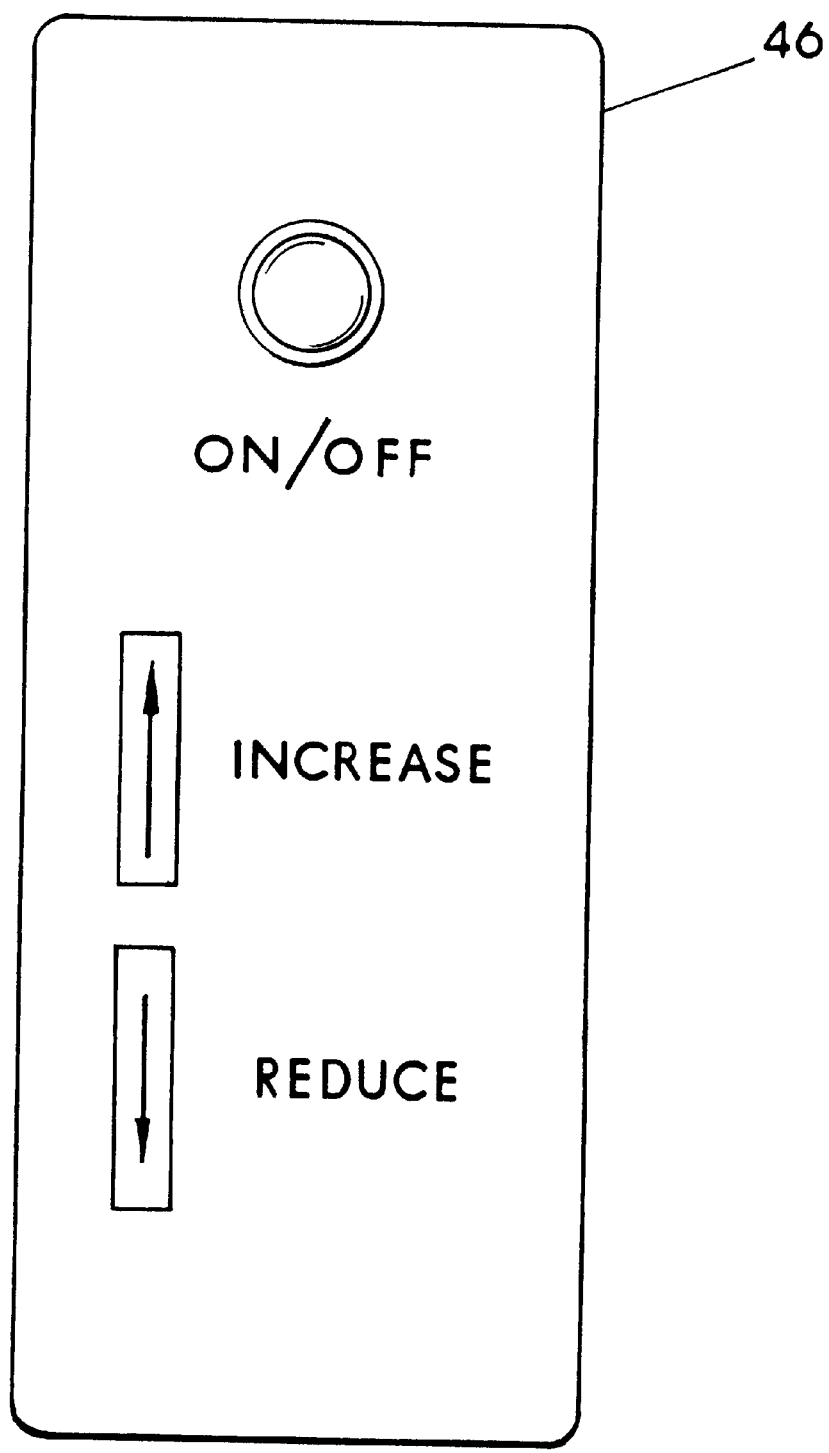
FIG. 9 shows a remote control unit for remotely controlling the electronics of the strobe light.

Housing 12 serves to contain battery or batteries 28, and electrical/electronic circuitry 30. Circuitry 30 can be altered from that shown. I prefer multiple batteries 28 although one would function in some applications. The circuitry of FIG. 5 is shown for example only, showing the poles of electrical power, two LEDs 18, an On/Off button switch 20 for On/Off control of the LEDs, a chip, ASIC or the like at 32, several resistors, a capacitor and circuit legs are shown. I have successfully used an NE 555 chip available from most electronic parts supply stores as chip 32 in circuitry 30, although there are many structural ways to control the automatic On/Off blinking of light emitters such as LEDs 18, and the rate of blinking or intensity of the light emitter (LEDs 18) if one desires such control. Thus, I do not wish to have the invention restricted to any particular circuitry, as any arrangement to cause the On/Off or lighter then darker cyclical illumination of the light bulb or LEDs will of course be effective for achieving the desired result. In the example, batteries 28 supply electrical power to circuitry 30 and LEDs 18, On/Off switch 20 is a two position switch for turning the electrical system Off when not in use. Circuitry 30 is automatic in terms of illuminating LEDs 18 and de-illuminating, and while the rate of On then Off cyclical switching can be varied very widely within the scope of the invention, for use in attracting North American ducks which flap their wings at a very high rate when flying, 6 times a second can be used, but this can be varied so widely such as 1 to 100 time/second for example only, depending on species and other factors such as ambient light, that I do not wish to have the invention restricted to the blinking rate, although it certainly is cycled On then Off more than once per minute during use in attracting the attention of overhead birds. The rate can be set at the factory or the circuitry 30 can be built to allow user manipulation of the rate of blinking, such as via user manipulable potentiometers, variable resistors and the like to bring about new settings. The user manipulable settings can be the intensity or brightness of the light and or rate of cycling between lighter and darker states. In the hand held remote control unit 46 of FIG. 9 which signals to antenna 44 using RF or the like (any suitable radiation), increase and reduce buttons are shown for intensity or rate control of the LEDs 18 from a distance. A remote On/Off button is also shown on remote control 46. By manipulating the brightness or intensity, differing brightness levels can appear as different colors. Additionally, differing levels of daylight such as early morning compared to mid-day allow or require differing brightness levels on the wing by the LEDs. The specific color of the light transmitted or reflected from the simulated wing structure will be determined by its use. The number of lights on each wing 10 will be determined by the size of the area to be illuminated and or by whether two colors of lights are to be used as described below. A single super bright white LED per wing 10 element as shown in the drawings will normally provide sufficient light for a duck sized wing structure, and "white" LEDs lend themselves better to the selection of a wider variety of reflected color, as opposed to red, green or amber LEDs. A white or grayish reflected color works well for most applications, but different colors can be used. Depending on the species being attracted or the ambient weather conditions such as heavy fog, ambient light conditions, wing 10 or LEDs might be changed to another color. Also, the alternating light then dark appearance simulating wing movement can be achieved by using two different colors of lights on a single wing 10 or wing area. For example, this two colored light arrangement would involve mounting a pair or a first and second light, i.e., white and a red, amber or green light (LED) or any combination of two light colors generally adjacent one another and operatively connected to automatic control circuitry so that when the first light is On, the second light is Off, then the first light is switched Off and the second light is switched On. The first light might be white light emitting, and the second light might be amber light emitting, for example only. This arrangement provides for the constant illumination of the wing 10, but retaining the cyclical light then dark appearance, an arrangement which is anticipated to be quite useful in fog or dim ambient lighting. A two light pair would be mounted, for example only, one pair on each side of housing 12 so that each wing 10 element has a pair associated therewith, wherein four LEDs would be used for example.

I claim:

1. A bird attracting decoy providing simulated wing flapping motion, said decoy comprising:
   a wing simulating structure for simulating flapping wings of a flying bird, the wing simulating structure including a pair of elongated members each upwardly dished on an upper surface, the upper surface of the elongated members facing upward in use for appearing as raised wings when illuminated;
   a buoyant body visually resembling a waterfowl bird, the wing structure mounted to the buoyant body;
   powering means;
   light emitting diodes positioned for illuminating the upper surface of the wing structure, the powering means operatively coupled to said light emitting diodes; and
   switching means operatively connectively circuited between said powering means and said light emitting diodes for switching said light emitting diodes cyclically On and then Off repeatedly, whereby the wing structure appears to be a pair of raised wings of a flying bird when the wing structure is illuminated with the light emitting diodes On, and the wing structure appears to be a pair of lowered wings of the flying bird when the wing structure is de-illuminated with the light emitting diodes Off.

2. A bird decoy providing simulated wing flapping motion, said decoy comprising:
   a wing simulating structure for simulating flapping wings of a flying bird, the wing simulating structure including a pair of elongated members each upwardly dished on an upper surface, the upper surface of the elongated members facing upward in use;
   a housing, the wing simulating structure mounted to said housing, said housing containing at least one electric battery;
   a buoyant body shaped to visually resemble a waterfowl, the housing mounted to said buoyant body;
   at least one white light emitting diode for each of the elongated members of the wing simulating structure, said at least one electric battery operatively connected for powering the light emitting diodes, the light emitting diodes mounted to the housing and positioned to illuminate the dished upper surface of the elongated members of the wing simulating structure;
   switching means for switching the light emitting diodes cyclically On and then Off in illumination upon the upper surface of the elongated members of the wing simulating structure, the light emitting diodes operatively connected to said switching means.

3. A bird decoy providing simulated wing flapping motion according to claim 2 wherein the housing includes a bottom having a first component which is one of a ferric-material and a magnet mounting structural arrangement for mounting the housing to the buoyant body, and the buoyant body includes a second component which is the other of said ferric-material and magnet mounting structural arrangement for magnetically coupling to said first component.

4. A bird decoy providing simulated wing flapping motion according to claim 3 wherein said first component is a magnet secured to the bottom of said housing, and said second component is a ferric-material plate mounted to the buoyant body, whereby said housing can be magnetically adhered to the buoyant body.

5. A bird decoy providing simulated wing flapping motion according to claim 4 wherein a shield is positioned over each of the light emitting diodes to help prevent emitted light from shining straight upward, and for aiding in directing emitted light over the upper surface.

6. A method of simulating wing flapping motion in a bird attracting decoy; the method including the steps of:
   providing a decoy comprising an elongated wing simulating structure, the wing simulating structure including a pair of elongated members each upwardly dished on an upper surface; the wing structure mounted to a buoyant body visually resembling a waterfowl bird, the wing structure positioned with the upper surface of the wing structure facing upward for appearing as raised wings when illuminated; and at least one electric powered light emitter positioned for illuminating the upper surface of the wing structure;
   using said at least one electric powered light emitter positioned for illuminating the upper surface of the elongated wing simulating structure to illuminate the upper surface to a first level of brightness for simulating the wing simulating structure in a raised position of flapping, and then
   reducing the level of brightness from said first level to a second level of brightness for de-illuminating the upper surface of the wing simulating structure for simulating the wing simulating structure in a lowered position of flapping.

7. A method of simulating wing flapping motion according to claim 6 wherein the at least one electric powered light emitter is cycled between illuminated and non-illuminated states for the first and second levels of brightness respectively.

8. A method of simulating wing flapping motion according to claim 6 wherein the at least one electric powered light emitter is a light emitting diode which is cycled between On and Off states by automatic circuitry for the first and second levels of brightness respectively.

* * * * *